US008866803B2

(12) United States Patent
Chikaoka et al.

(10) Patent No.: US 8,866,803 B2
(45) Date of Patent: Oct. 21, 2014

(54) IMAGE DISPLAY DEVICE DISPLAYING IMAGE BY APPLYING LASER LIGHT

(75) Inventors: Atsuhiko Chikaoka, Daito (JP); Ken Nishioka, Daito (JP); Tomohisa Hirai, Daito (JP); Manabu Murayama, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 954 days.

(21) Appl. No.: 12/419,795

(22) Filed: Apr. 7, 2009

(65) Prior Publication Data

US 2009/0284506 A1    Nov. 19, 2009

(30) Foreign Application Priority Data

May 13, 2008 (JP) .................. 2008-126185

(51) Int. Cl.
 *G09G 5/00* (2006.01)
 *G06F 3/038* (2013.01)
 *H04N 9/31* (2006.01)

(52) U.S. Cl.
 CPC ........... *H04N 9/3155* (2013.01); *H04N 9/3129* (2013.01)
 USPC .......................................... 345/207; 345/204

(58) Field of Classification Search
 CPC .............................. G09G 3/346; G09G 3/3473
 USPC ...................... 345/204, 207, 211–215, 76–81
 See application file for complete search history.

(56) References Cited

U.S. PATENT DOCUMENTS

| 5,315,112 | A | * | 5/1994 | Harris | 250/235 |
| 5,339,118 | A | * | 8/1994 | Tagami | 348/744 |
| 5,347,298 | A | * | 9/1994 | Gokita | 347/133 |
| 6,091,461 | A | * | 7/2000 | Bardmesser | 348/744 |
| 6,462,838 | B1 | * | 10/2002 | Hirata et al. | 358/3.05 |
| 2004/0130668 | A1 | | 7/2004 | Greve et al. | |
| 2006/0087628 | A1 | | 4/2006 | Dvorkis et al. | |
| 2006/0255243 | A1 | | 11/2006 | Kobayashi et al. | |
| 2006/0291027 | A1 | | 12/2006 | Taniguchi | |
| 2007/0063134 | A1 | | 3/2007 | Wine et al. | |

FOREIGN PATENT DOCUMENTS

| JP | 07-264615 A | 10/1995 |
| JP | 2000294871 A | 10/2000 |
| JP | 2003-5110 | 1/2003 |
| JP | 2003131151 A | 5/2003 |
| JP | 2005-77431 | 3/2005 |

(Continued)

OTHER PUBLICATIONS

Extended European Search Report for Application No. 09003971.0, Dated Jul. 13, 2009, 6 pages.
Patent Abstracts of Japan for Japanese Publication No. 2005-077431, publication date Mar. 24, 2005 (1 page).
Patent Abstracts of Japan for Japanese Publication No. 2005-242036, publication date Sep. 8, 2005 (1 page).

(Continued)

*Primary Examiner* — Jonathan Horner
(74) *Attorney, Agent, or Firm* — Osha Liang LLP

(57) ABSTRACT

A scanning position of laser light applied to a projection plane is detected, and based on the detected scanning position, a synchronization signal is generated to designate a scan timing. A correction region detection portion detects whether or not a part corresponding to a prescribe region of an image on the projection plane is scanned by laser light, based on the generated synchronization signal. When the part corresponding to the prescribed region is scanned, a correction amount derivation portion corrects a gradation signal based on the difference between the detected quantity of laser light and a prescribed quantity of light to be output from the laser for displaying the image in the prescribed region.

14 Claims, 13 Drawing Sheets

(56) References Cited

FOREIGN PATENT DOCUMENTS

| | | |
|---|---|---|
| JP | 2005-242036 | 9/2005 |
| JP | 2006093822 A | 4/2006 |
| JP | 2006-317681 A | 11/2006 |
| JP | 2007-3687 | 1/2007 |
| JP | 2007-114526 | 5/2007 |
| JP | 2007140010 A | 6/2007 |
| WO | 2008/032244 | 3/2008 |

OTHER PUBLICATIONS

Patent Abstracts of Japan for Japanese Publication No. 2007-003687, publication date Jan. 11, 2007 (1 page).

Patent Abstracts of Japan for Japanese Publication No. 2007-114526, publication date May 10, 2007 (1 page).

Patent Abstracts of Japan for Japanese Publication No. 2003-005110, publication date Jan. 8, 2003 (1 page).

* cited by examiner

FIG.14A
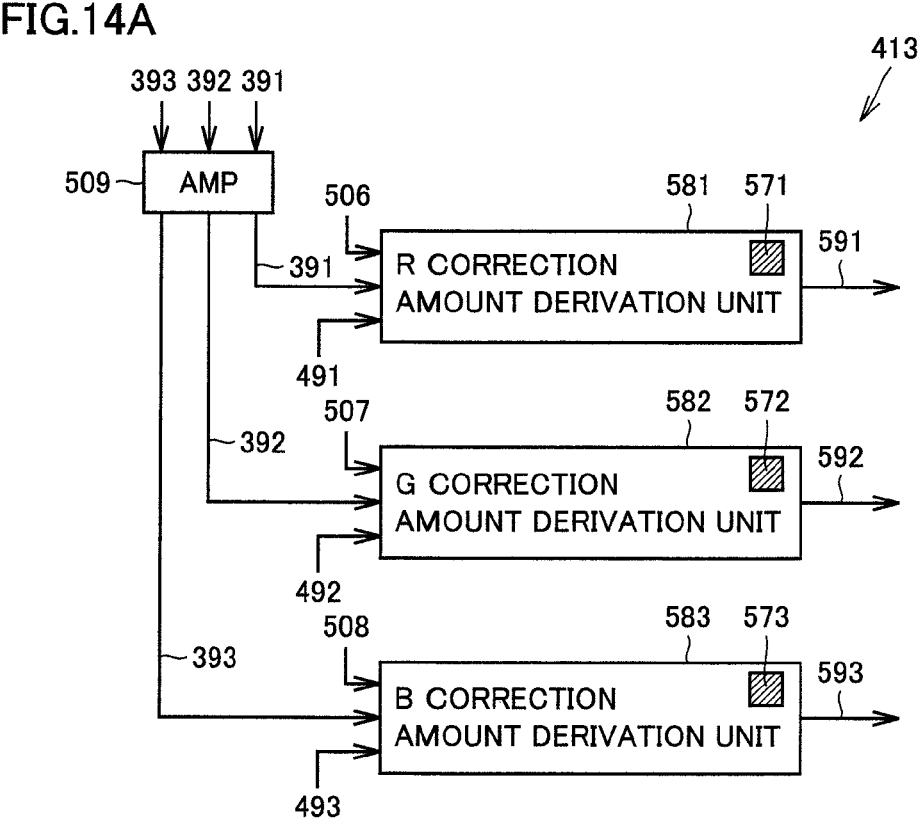
FIG.14B
| 574:DIFFERENCE | 575:ADJUSTMENT AMOUNT |
|---|---|
| △△1 | ××1 |
| △△2 | ××2 |
| ⋮ | ⋮ |
571 (572,573)
FIG.15
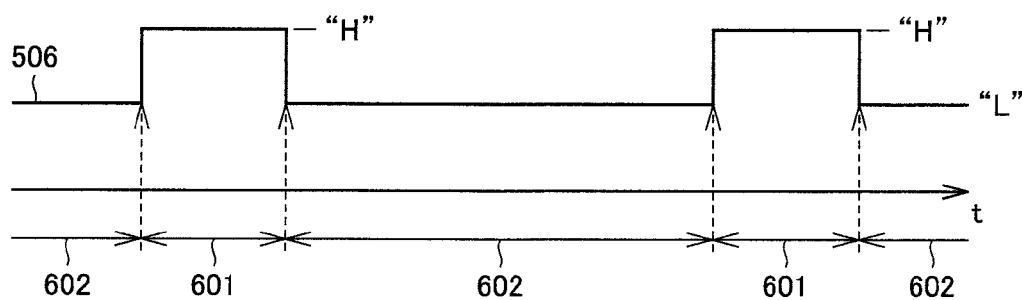

IMAGE DISPLAY DEVICE DISPLAYING IMAGE BY APPLYING LASER LIGHT

BACKGROUND OF THE INVENTION

1. Field of the Invention

The present invention relates to an image display device, and more particularly to an image display device for displaying an image by irradiating a projected plane with laser light.

2. Description of the Background Art

Image display devices displaying images by applying laser light onto projected planes such as screens or walls include so-called laser projectors. In a laser projector, laser lights of three primary colors of red, green and blue need to be prepared in order to reproduce images in full color. The configurations concerning image display using laser light in this manner are proposed in the followings.

Japanese Patent Laying-Open No. 2003-005110 discloses a configuration in which the timing of driving a light source and the modulation timing are synchronized with each other. For this purpose, a special pattern for detecting the quantity of light is prepared. A configuration to prevent this pattern from being projected is disclosed.

Japanese Patent Laying-Open No. 2007-114526 discloses a configuration to obtain information about positional displacement of scanning of a light spot.

Japanese Patent Laying-Open No. 2007-003687 discloses a configuration in which when an image is displayed by two-dimensional scanning, driving of a light source means is controlled by detecting failures of a scan means and the light source means based on an output signal from a light-receiving means.

Japanese Patent Laying-Open No. 2005-242036 discloses a configuration to correct the positions of light spots by multiple light sources.

Japanese Patent Laying-Open No. 2005-077431 discloses an apparatus capable of accurately detecting a synchronization signal to allow images of good image quality to be displayed and viewed.

The apparatus such as a laser projector which displays an image by applying laser light onto a projected plane includes, for example, a laser diode as a light source. It is known that when a laser diode is powered for a long time, the temperature of the laser diode itself changes and thus the response characteristic changes with the temperature change. In other words, the quantity of light output with respect to the level of current applied to the laser diode for driving decreases with increasing temperature. As a result, the quantity of light which should be achieved for a prescribed gradation at room temperature cannot be achieved at a temperature rise, so that the image quality of display images is reduced. Therefore, it has been desired that the image quality of display images is appropriately maintained with a simple configuration, irrespective of such a response characteristic change.

In this respect, Japanese Patent Laying-Open No. 2003-005110 proposes that special pattern information is prepared, the quantity of light output by driving a laser diode according to the pattern information is monitored, and the reference value of the driving current of the laser diode is updated based on the monitor result. However, special pattern information needs to be prepared. Moreover, special control is required so that an image according to the pattern information is not displayed, thereby complicating the configuration.

Furthermore, Japanese Patent Laying-Open Nos. 2007-114526, 2007-003687, 2005-242036, and 2005-077431 as described above do not disclose a specific technique for correcting output variations of the light source.

SUMMARY OF THE INVENTION

An object of the present invention is to provide an image display device correcting variations in quantity of output light of a laser with a simple configuration.

In order to achieve the aforementioned object, an image display device in accordance with an aspect of the present invention displays an image by irradiating a projection plane with laser light while scanning the same in vertical and horizontal directions. Specifically, the image display device includes: a laser driven based on a drive signal to output laser light having a quantity of light based on a gradation signal according to image data; a scanning position detection unit detecting a scanning position of the projection plane which is irradiated by the laser light; a vertical horizontal synchronization signal generation unit generating and outputting a vertical synchronization signal and a horizontal synchronization signal designating a drive timing of the laser, based on the scanning position detected by the scanning position detection unit; a drive signal generation unit generating a pixel synchronization signal according to the generated vertical and horizontal synchronization signals and the image data and outputting the generated pixel synchronization signal as the drive signal; a region detection unit; a quantity of light detection unit detecting a quantity of light of the laser light output by the laser; and a signal correction unit correcting the gradation signal. The region detection unit receives the vertical and horizontal synchronization signals and the pixel synchronization signal and detects whether or not a part corresponding to a prescribed region of the image is scanned on the projection plane by the laser light, based on the received synchronization signals.

When the region detection unit detects that the part corresponding to the prescribed region of the image is scanned on the projection plane by the laser light, the signal correction unit corrects the gradation signal, based on a difference between the quantity of light detected by the quantity of light detection unit and a prescribed quantity of light to be output from the laser for displaying the image corresponding to the prescribed region, and outputs the corrected gradation signal to the laser.

Preferably, the scanning position detection unit includes a light detection unit detecting the laser light in an optical path of the laser light applied from the laser toward a prescribed scanning position of the projection plane. The scanning position on the projection plane by the laser light is detected based on an elapsed time from a point of time when the laser light is detected and the prescribed scanning position.

Preferably, the region detection unit includes a coordinate detection unit detecting a position on the projection plane to which laser light is applied, by coordinates according to the vertical and horizontal directions, based on the received synchronization signals, and a coordinate comparison unit comparing prescribed coordinates designating the part corresponding to the prescribed region with the coordinates detected by the coordinate detection unit to output a comparison result. The comparison result designates whether or not the part corresponding to the prescribed region of the image is scanned on the projection plane by the laser light.

Preferably, when the region detection unit detects that the part corresponding to the prescribed region of the image is scanned on the projection plane by the laser light, the signal correction unit corrects the gradation signal according to the difference and a prescribed characteristic value indicating a correlation between the quantity of light of laser light output by the laser at room temperature and a level of the gradation signal.

Preferably, the image data includes data of a source image corresponding to contents to be displayed and data of an image of an interface unique to the image display device to be displayed for externally providing an instruction to the image display device. The prescribed region is a region corresponding to the image of the interface.

Preferably, the region corresponding to the image of the interface is a frame-like region surrounding the image of the interface for separating the source image from the image of the interface region.

Preferably, the region corresponding to the image of the interface is a region in which an image serving as a background of the image of the interface is displayed.

Preferably, the prescribed region is a part or all of the region corresponding to the image of the interface.

In accordance with the present invention, a drive signal of a laser can be corrected using known image data in a prescribed region of an image to be displayed. Thus, even when variations in quantity of output light of the laser occurs in a period during which laser light for displaying an image in the other region except the prescribed region is output, the precision of output control of the laser light can be improved by correcting the output variations. As a result, even without preparation of a special image pattern for correcting output variations, errors in regard to gradation representation of a display image, which would occur due to output variations of the laser, are reduced. Therefore, even with a simple configuration, high quality images can be displayed.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 14A and FIG. 14B are diagrams showing a configuration of a correction amount derivation portion in accordance with the present embodiment.

FIG. 15 is a diagram showing the timings of updating and holding the correction amount in accordance with the present embodiment.

DESCRIPTION OF THE PREFERRED EMBODIMENTS

In the following, an embodiment of the present invention will be described with reference to the drawings. In the following description, the same parts are denoted with the same characters. The designations and functions are also the same. Therefore, the detailed description thereof will not be repeated.

Figure 1:
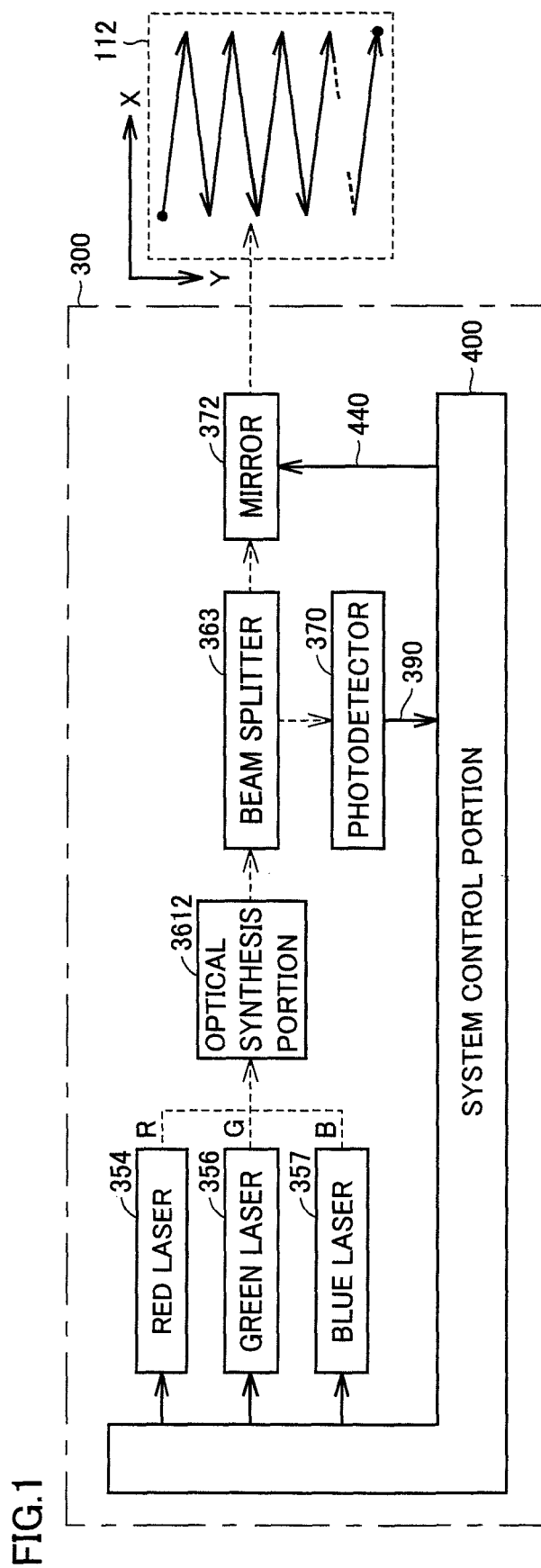
FIG. 1 is a schematic configuration diagram of an image display device in accordance with an embodiment of the present invention.

FIG. 1 shows a schematic configuration of an image display device 300 in accordance with the present embodiment. Image display device 300 forms and displays an image according to image data by two-dimensionally scanning light output from a light source on a projection plane 112. The direction to scan includes a horizontal scanning direction and a vertical scanning direction. In display operation, image display device 300 corrects variations of outputs of a laser diode (referred to as LD hereinafter) as a light source.

Here, for the sake of simplicity, a display region of projection plane 112 and the shape and size of an image indicated by image data have a correspondence relation. It is assumed that both are plane regions of two-dimensional coordinates, each defined by two lines (X-axis and Y-axis) orthogonal to each other. The direction in which the X-axis extends corresponds to the horizontal scanning direction, and the direction in which the Y-axis extends corresponds to the vertical scanning direction.

Figure 16A:
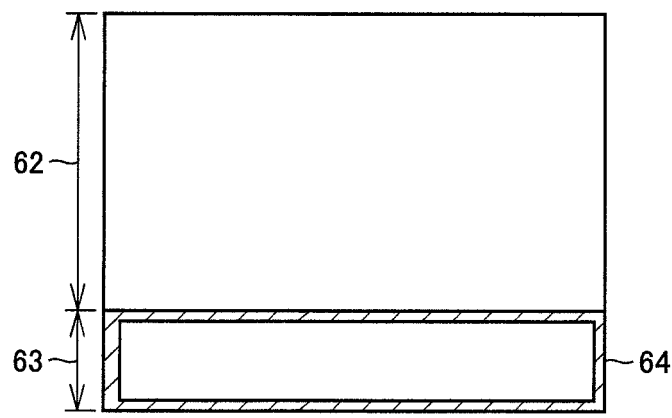
FIG. 16A, FIG. 16B and FIG. 16C are diagrams showing the arrangements of the correction region in a projection plane.
Figure 16B:
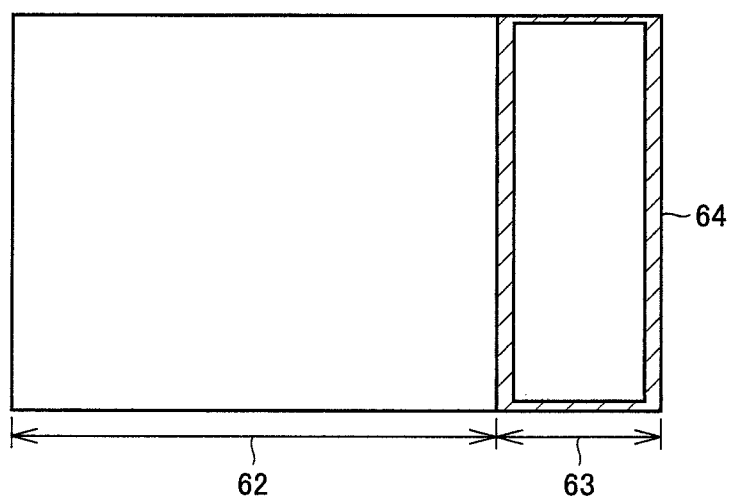
Figure 16C:
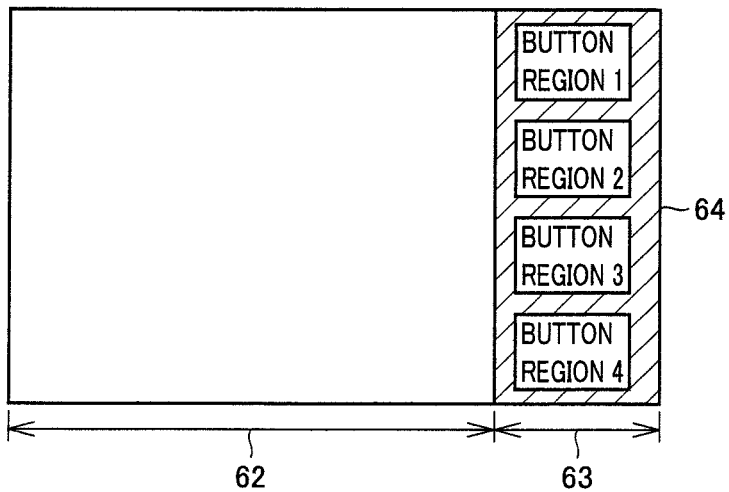

In the present embodiment, in display operation by image display device 300, for example, as shown in FIG. 16A-FIG. 16C, an image is displayed in a source image display region 62 and a UI (User Interface) display region 63 on projection plane 112. In source image display region 62, images unique to contents to be displayed (broadcast programs, movies, and the like) are displayed. In UI display region 63, images for instruction data for the user to operate image display device 300 are displayed. The user can operate image display device 300 by inputting the instruction data appearing on UI display region 63.

In UI display region 63, according to data of unique images stored beforehand in a memory of image display device 300 (referred to as unique image hereinafter), unique images are displayed. UI display region 63 has a correction region 64 for use to correct variations of outputs of LD.

As shown in FIG. 16A and FIG. 16B, correction region 64 corresponds to a frame-like region (in the figure, the shaded region) surrounding UI display region 63 in order to separate UI display region 63 from source image display region 62. Alternatively, as shown in FIG. 16C, correction region 64 corresponds to a region (in the figure, the shaded region) in which an image serving as the background of images of instruction data in UI display region 63.

It is noted that, for the sake of simplicity, in the present embodiment, the arrangement of the region is assumed as shown in FIG. 16A.

Image display device 300 performs a correction operation, for a part of period of time during which laser light is scanned on projection plane 112 according to a unique image, that is, when it is detected that LD is driven to emit light based on the result of modulating image data in correction region 64. In other words, the timing at which laser light is applied according to a particular pattern present at a particular location corresponding to the correction region on the image data is detected, and the quantity of light is monitored at the detected timing so that a signal for driving the laser is corrected based on the monitoring result. In the correction, the intensity of laser light applied for image display in correction region 64 corresponding to this particular pattern is measured, and the laser drive signal is corrected based on the measurement result such that the output level of the laser attains a proper level according to the pixel value of correction region 64. Thus, the laser output variations are corrected. Here, the intensity of laser light corresponds to luminance and is indicated by the quantity of emission light.

Referring to FIG. 1, image display device 300 includes, as light sources, a red laser 354 that is an LD outputting red laser light, a green laser 356 that is an LD outputting green laser light, and a blue laser 357 that is an LD outputting blue laser light. Image display device 300 further includes an optical synthesis portion 3612 receiving three laser lights output from the respective lasers and synthesizing the same for output, a beam splitter 363 receiving the synthesized light output from optical synthesis portion 3612 (light of mixed beams of three colors) and dividing and outputting the received light in two directions, a mirror 372 vibrated using MEMS (Micro Electro Mechanical Systems), a photodetector 370 formed of PD (Photo Diode), and a system control portion 400.

Mirror 372 is vibrated by MEMS to realize movement of a spot on projection plane 112 of laser light incident on the mirror surface and reflected at the mirror surface. In other words, mirror 372 is vibrated by a mirror drive signal 440 provided from system control portion 400. Vibration allows a reflection angle of laser light incident on the mirror surface to change, so that the position of the spot of laser light reflected at mirror 372 and then applied to projection plane 112 is controlled. In image display operation, mirror 372 is vibrated based on the provided mirror drive signal 440. In connection with the vibration, the spot of laser light reflected at the mirror surface and applied to projection plane 112 is moved in the directions according to the X-axis and the Y-axis. Thus, as shown in FIG. 1, the spot moves in the arrow direction from the upper left end (the origin of coordinates) to the lower right end of projection plane 112, so that an image is displayed on projection plane 112.

Beam splitter 363 receives and splits laser light output from optical synthesis portion 3612 and outputs one of the split laser light to mirror 372 and the other laser light to photodetector 370. The laser light output from beam splitter 363 to mirror 372 has the quantity of light sufficient to display an image on projection plane 112.

Upon receiving laser light, photodetector 370 performs photoelectric conversion to output to system control portion 400 a light detection signal 390 which is a current signal at a level corresponding to the quantity of received laser light. Light detection signal 390 indicates the intensity of laser light.

Figure 2A:
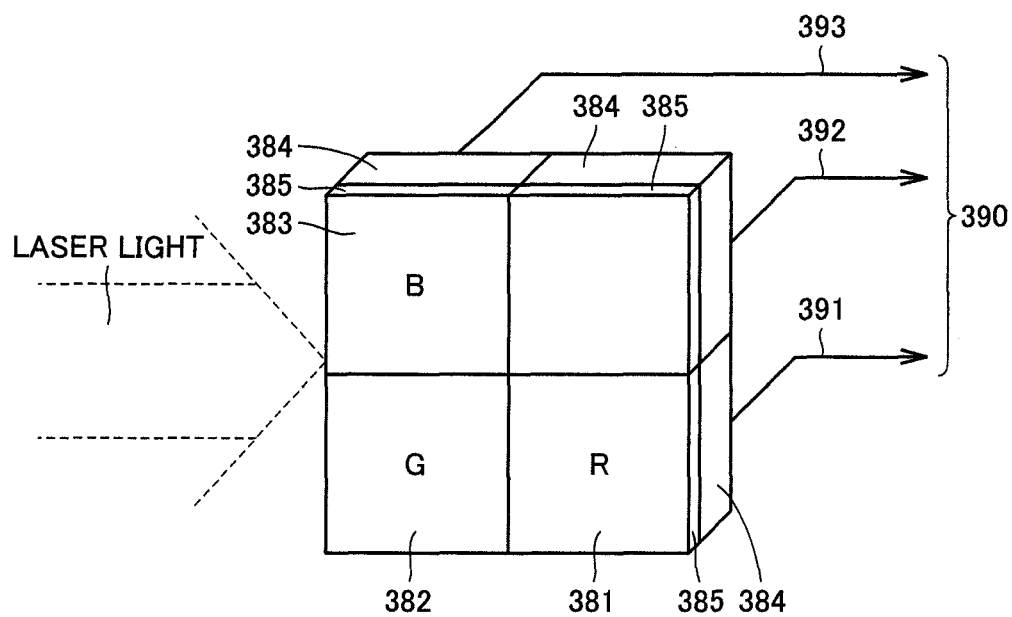
FIG. 2A and FIG. 2B are diagrams showing an exemplary configuration of a photodetector in accordance the present embodiment.
Figure 2B:
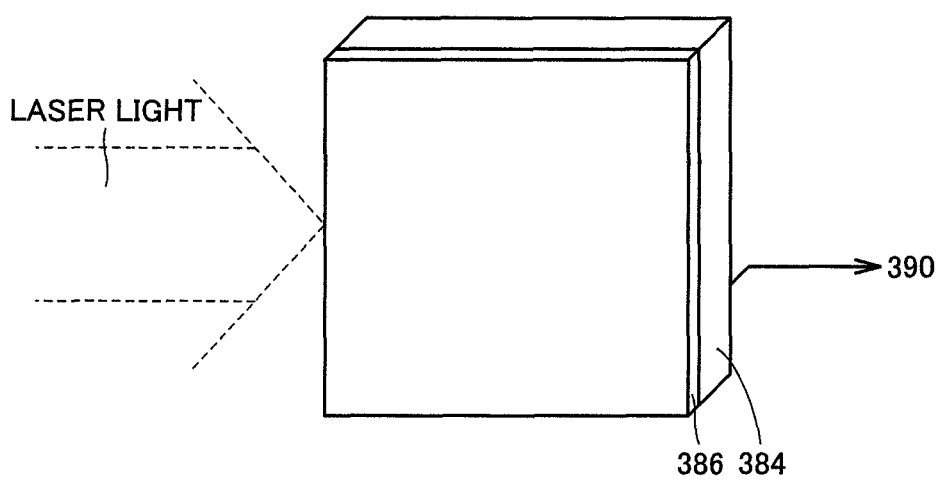

FIG. 2A and FIG. 2B show an exemplary configuration of photodetector 370 in accordance with the present embodiment. Referring to FIG. 2A, photodetector 370 has regions 381, 382, 383 for detecting the corresponding light, corresponding to light with the red wavelength, light with the green wavelength, and light with the blue wavelength, respectively. Each of these regions is integrally formed of a photodiode 384 and a color filter 385. Specifically, in each region, color filter 385 is integrally attached to the light-receiving surface of photodiode 384. The color filter of each region has a property for allowing only light with the wavelength corresponding to that region to pass through. Therefore, in each region, only light of the corresponding color passes through the color filter 385 and is detected by photodiode 384. The light detected by photodiode 384 in regions 381-383 is converted into light detection signals 391-393 for output, which are current signals corresponding to the quantity of received light. Light detection signal 390 includes light detection signals 391-393.

Here, it is assumed that the pixels of correction region 64 are comprised of three primary colors of red, green and blue, and photodetector 370 therefore has the configuration in FIG. 2A. However, the present invention is not limited thereto. For example, a simplified configuration as shown in FIG. 2B may be employed.

In FIG. 2B, photodetector 370 may include, instead of color filter 385, a filter 386 having a property of allowing the light with all the wavelengths applied by LD of image display device 300 to pass through and may be comprised of filter 386 and photodiode 384. The filter 386 is integrally formed on the light-receiving surface of photodiode 384. In this case, an optical output correction portion 404, which will be described later, operates to detect and update the correction amount of the drive signal of each LD at each different time.

Figure 3:
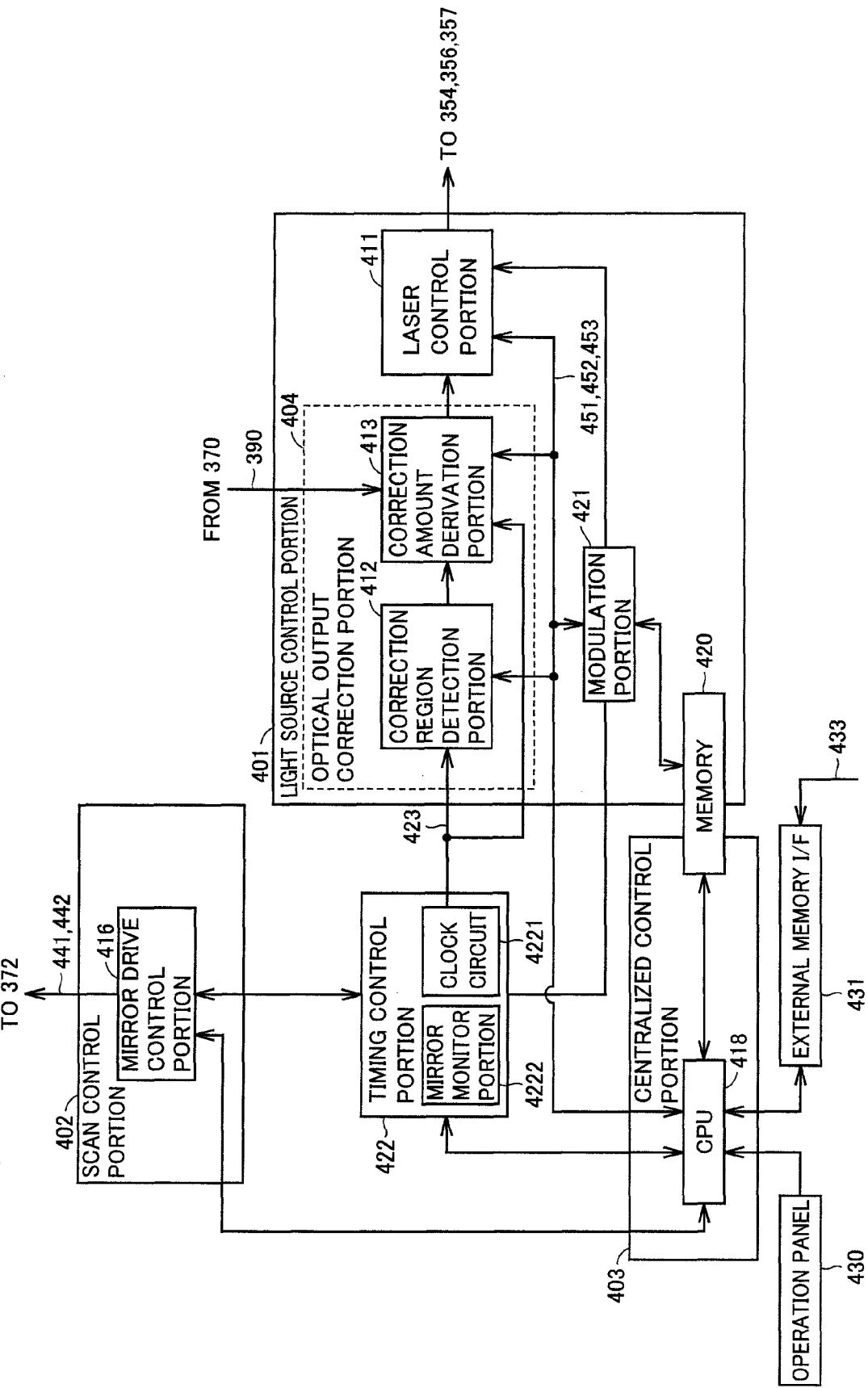
FIG. 3 is a diagram showing a functional configuration of a system control portion in accordance with the present embodiment.

Referring to FIG. 3, system control portion 400 includes a light source control portion 401, a scan control portion 402 controlling scanning of laser light on projection plane 112, a centralized control portion 403, and a timing control portion 422.

Light source control portion 401 includes optical output correction portion 404, a laser control portion 411 controlling the respective driving of lasers 354, 356 and 357, a modulation portion 421, and a memory 420. Optical output correction portion 404 includes a correction region detection portion 412 and a correction amount derivation portion 413.

Scan control portion 402 includes a mirror drive control portion 416 for controlling the inclination of the mirror surface by vibrating mirror 372.

Centralized control portion 403 includes a CPU (Central Processing Unit) 418 controlling each of the other portions and memory 420. CPU 418 has a function of controlling each of timing control portion 422, scan control portion 402, and light source control portion 401.

Timing control portion 422 includes a clock circuit 4221 and a mirror monitor portion 4222 as described later.

Image display device 300 further includes an operation panel 430 and an external memory I/F (abbreviation for interface) 431 in connection with centralized control portion 403. Operation panel 430 is comprised of buttons, switches, and the like operated by the user to input an instruction for controlling an operation of the device to CPU 418. External memory I/F 431 receives data 433 read from a not-shown external memory and provides the same to CPU 418. CPU 418 stores the received data 433 into memory 420. Data 433 indicates image data for displaying an image in region 62 as shown in FIG. 16A-FIG. 16C.

Optical output correction portion 404 controls the operation of laser control portion 411 based on a position signal 423 applied from timing control portion 422, a control signal by CPU 418, and light detection signal 390 applied from photodetector 370.

When an image is to be displayed, image data of regions 62-64 are read from memory 420 by CPU 418. Image data in memory 420 includes data such as gradation data indicating a gradation for each pixel, a frame rate, an image size, image resolution, and the number of pixels of one line of horizontal scanning.

CPU 418 provides gradation data read from memory 420 to modulation portion 421 in synchronization with the internally generated clock CLK. Modulation portion 421 modulates the provided gradation data and then provides the modulated data to laser control portion 411. Furthermore, a pixel synchronization signal 523 generated by timing control portion 422 as described later is modulated through modulation portion 421 and is then applied to laser control portion 411. Therefore, laser control portion 411 controls the amount of emission light of each LD based on the modulated signals 451, 452 and 453 according to the received gradation data and also controls a light emission timing of each LD in synchronization with the received, modulated pixel synchronization signal 523.

Timing control portion 422 generates a signal for vibrating mirror 372 and provides the same to mirror drive control portion 416. Mirror drive control signal 416 generates a signal controlling mirror 372 based on the received signal for output to mirror 372. The vibration of mirror 372 is controlled by this control signal. In addition, timing control portion 422 detects position signal 423 indicating a scanning position of laser light on projection plane 112, that is, a position to be irradiated with emission light of LD and outputs the same to correction region detection portion 412.

Detection of position signal 423 will now be described. Image display device 300 includes a light source and a scanning device scanning the light output from the light source on projection plane 112 in the XY two-dimensional directions. Specifically, the light source is lasers 354, 356 and 357 and the scanning device corresponds to mirror 372.

Figure 4:
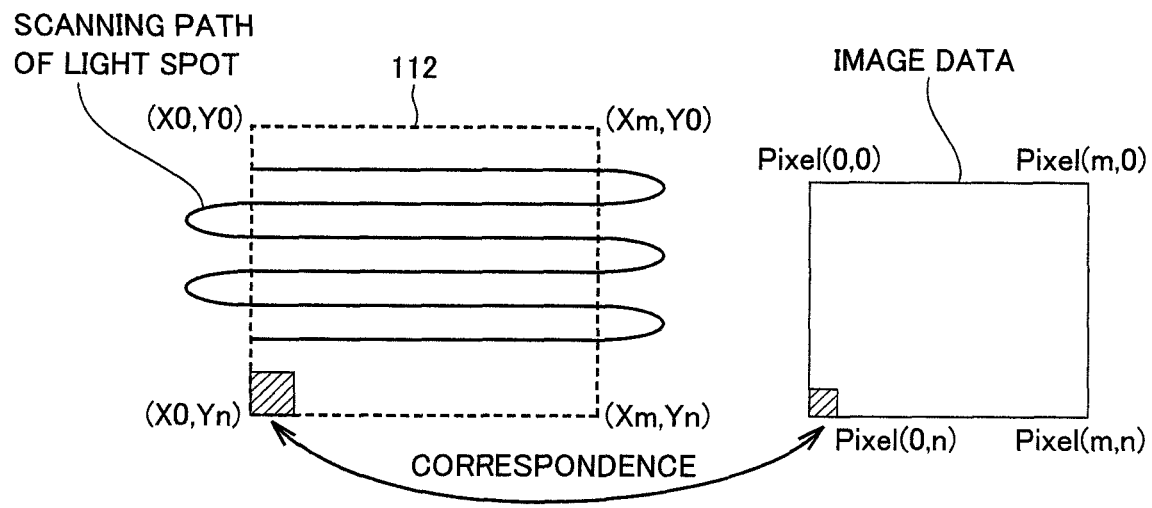
FIG. 4 is a diagram illustrating scanning of a light spot in accordance with the present embodiment.

By vibrating mirror 372 such that light beam is moved in the XY two-dimensional directions on projection plane 112, a light spot is scanned such that the light spot follows a path to form a rectangular region while repeatedly drawing horizontal lines. Referring to FIG. 4, when scanning proceeds from the upper left end to the lower right end direction of projection plane 112, scanning is performed in such a manner that a light spot output from the light source passes through (X0, Y0), (X1, Y0), (X2, Y0), . . . , (Xm, Y0), (Xm, Y1), . . . , (X0, Y1), (X0, Y2), . . . . Here, a part of the region to be scanned corresponds to a projection region (a region for displaying an image).

The projection region is assumed to be composed of a plurality of sections corresponding to pixel (0, 0)-pixel (m, n) of image data. At the timing at which light scans the section corresponding to each pixel, the light source is driven to output light according to the gradation corresponding to each pixel, so that an image is formed on projection plane 112. In this manner, in the present embodiment, the light source is driven according to scanning of light on projection plane 112. This will be described specifically below.

Figure 5:
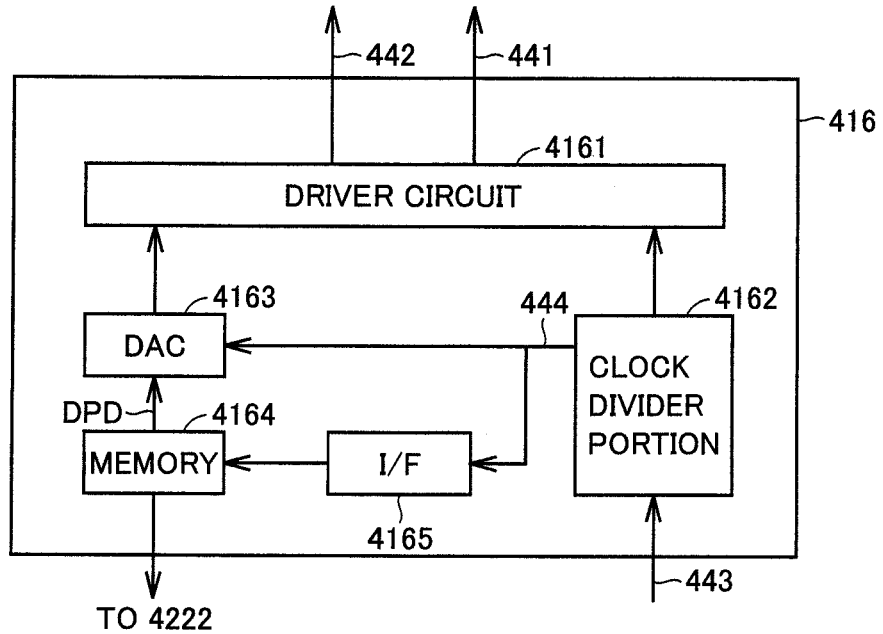
FIG. 5 is a diagram showing a configuration of a mirror drive control portion in accordance with the present embodiment.

Referring to FIG. 5, mirror drive control portion 416 includes a driver circuit 4161, a clock divider portion 4162, a DAC (digital to analog converter) 4163, and a memory 4164, and an I/F (abbreviation of interface) 4165 provided for memory 4164. Generation of a signal controlling vibration of mirror 372 by mirror drive control portion 416 will now be described.

Mirror drive control portion 416 generates and outputs a horizontal drive signal 441 for vibrating mirror 372 in the horizontal direction and a vertical drive signal 442 for vibrating mirror 372 in the vertical direction, as drive signal 440 for vibrating mirror 372.

Figure 6:
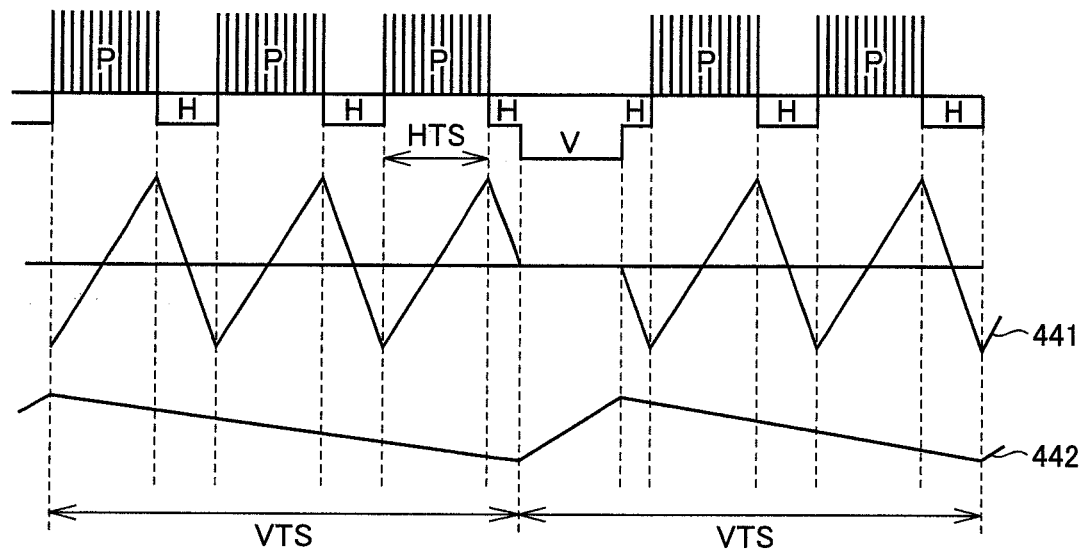
FIG. 6 is a diagram showing the timings of a drive signal and a synchronization signal in accordance with the present embodiment.

FIG. 6 schematically shows a timing chart of horizontal drive signal 441, vertical drive signal 442, and the synchronization signal.

First, generation of horizontal drive signal 441 will be described.

In order to resonantly drive mirror 372 in the horizontal direction, clock divider portion 4162 receives a clock 443 supplied from clock circuit 4221 of timing control portion 422 and divides the received clock 443 for output according to a prescribed division ratio. Thus, a rectangular wave signal having the same frequency as the resonance frequency that is the frequency at which mirror 372 vibrates in the horizontal direction is generated and output to driver circuit 4161. Driver circuit 4161 amplifies and shapes the received rectangular wave signal from clock divider portion 4162, and thereby, generates and outputs horizontal drive signal 441 (see FIG. 6). Here, the resonance frequency in the horizontal direction of mirror 372 is a value unique to mirror 372 and corresponds to a resolution of an image presented by image display device 300 on projection plane 112. Therefore, the division ratio of clock divider portion 4162 is predetermined according to the resolution data of the image read by CPU 418 from memory 420.

Generation of vertical drive signal 442 will now be described.

Figure 7:
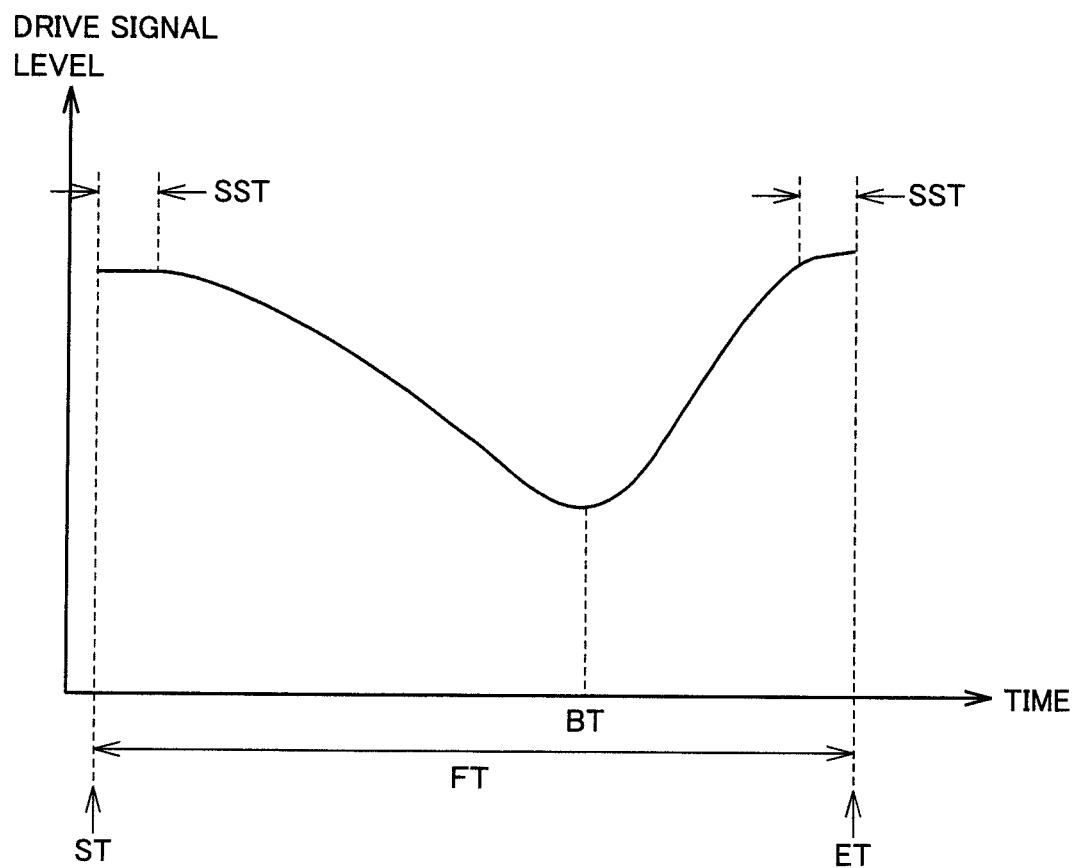
FIG. 7 is a diagram showing drive pattern data in accordance with the present embodiment.

Mirror 372 is driven according to a DC (direct current) signal for vibration in the vertical direction. Drive pattern data DPD corresponding to one back-and-forth scanning in the vertical direction is stored beforehand in memory 4164. Drive pattern data DPD is schematically shown in FIG. 7. Drive pattern data DPD indicates data of a drive signal level associated with scan time FT in one frame. One frame scan time FT is designated at the start and the end (point of times ST and ET in FIG. 7) and determined according to the frame rate read from memory 420. A light spot on projection plane 112 is positioned at (X0, Y0) in FIG. 4 at the start of frame scan time FT (point of time ST in FIG. 7) and positioned at (Xm, Yn) in FIG. 4 at the time (point of time BT in FIG. 7) when the drive signal level designates a value corresponding to the bottom of the drive waveform.

I/F 4165 reads drive pattern data DPD from memory 4164 in synchronization with clock 444 output from clock divider portion 4162. The read drive pattern data DPD is applied to DAC 4163. DAC 4163 converts drive pattern data DPD into an analog signal for output to driver circuit 4161 in synchronization with clock 444 input from clock divider portion 4162. Driver circuit 4161 receives the drive pattern signal applied from DAC 4163 and performs wave-shaping, amplification, and the like on the input signal for output in synchronization with clock 444. As a result, vertical drive signal 442 (see FIG. 6) is generated and output by driver circuit 4161.

Here, clock 444 is generated by clock divider portion 4162 dividing the frequency of clock signal 443 supplied from timing control portion 422. Clock 444 is a signal having such a frequency that allows mirror 372 to reciprocate using the aforementioned drive pattern data DPD within a time of 1/frame-rate (corresponding to one frame scan time FT in FIG. 7). Furthermore, drive pattern data DPD has a waveform shape for operating mirror 372 linearly in a period during which a light spot is scanning in the vertical direction on projection plane 112. Specifically, as shown in FIG. 7, a period SST for synchronization with the horizontal drive signal exists at the end of a period (cycle) of one back-and-forth scanning in the vertical direction.

Figure 8:
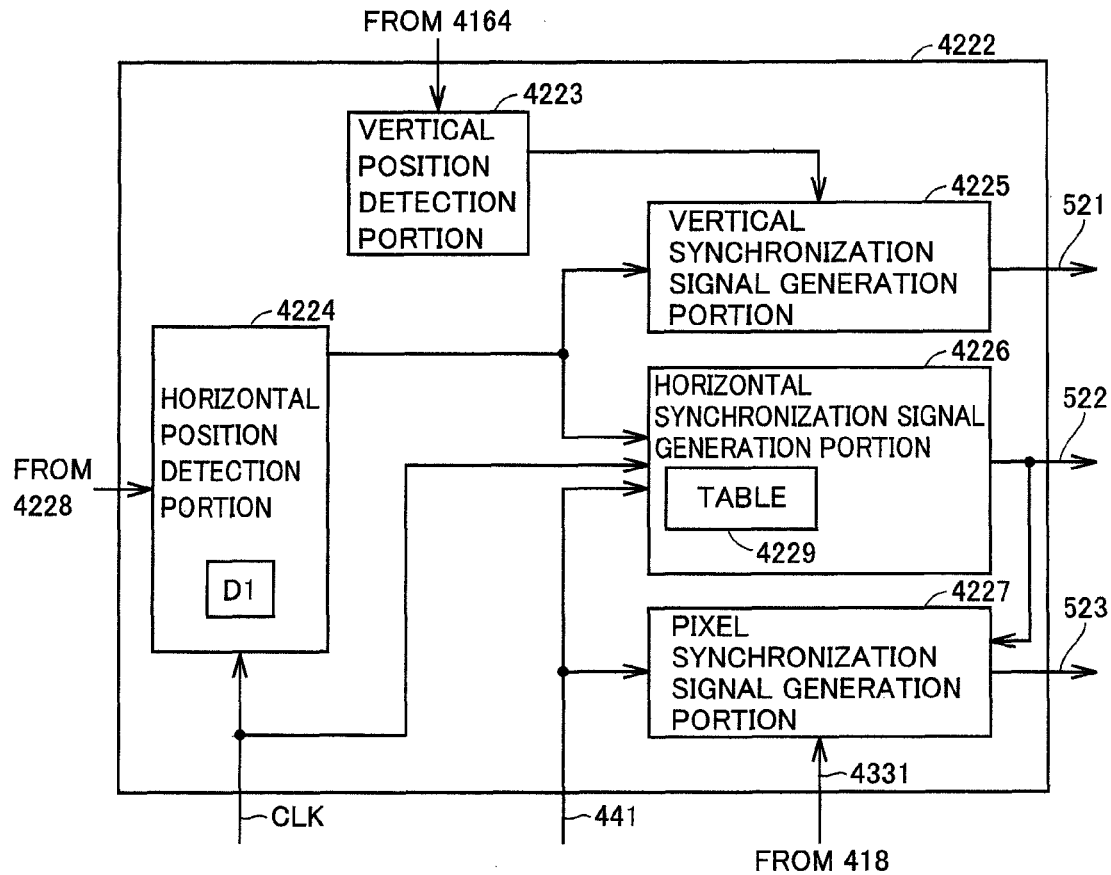
FIG. 8 is a diagram showing a configuration of a mirror monitor portion in accordance with the present embodiment.

Referring to FIG. 8, mirror monitor portion 4222 of timing control portion 422 will be described.

Mirror monitor portion 4222 includes a vertical position detection portion 4223, a horizontal position detection portion 4224, a vertical synchronization signal generation portion 4225, a horizontal synchronization signal generation portion 4226 having a table 4229, and a pixel synchronization signal generation portion 4227.

Figure 9:
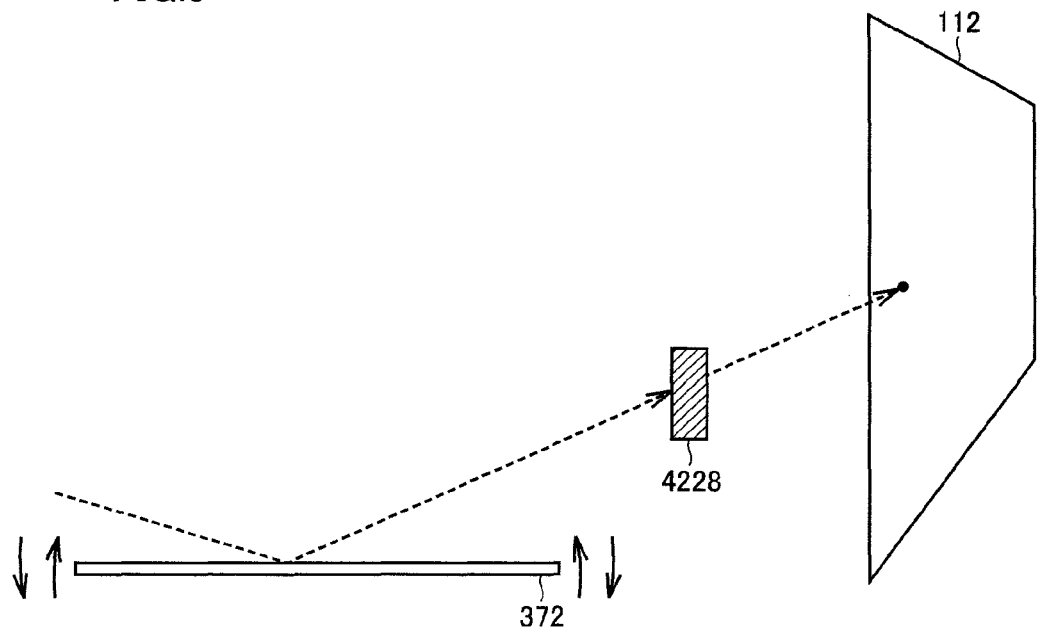
FIG. 9 is a diagram illustrating a photodetector provided in relation with a mirror in accordance with the present embodiment.

Image display device 300 is provided with a photodetector 4228 for monitoring the motion of mirror 372, in connection with mirror 372. Photodetector 4228 has a similar configuration to that of FIG. 2B and, as shown in FIG. 9, is provided in the course of an optical path along which light reflected at mirror 372 travels to projection plane 112.

Detection of a light scanning position in the horizontal direction by horizontal position detection portion 4224 will now be described.

Photodetector 4228 is provided to be directed to a prescribed scanning position in the horizontal direction on projection plane 112 (referred to as a prescribed horizontal position hereinafter) and fixed on the optical path along which reflected light from mirror 372 travels. The position where photodetector 4228 is to be mounted is detected in advance by experiment or the like.

Photodetector 4228 receives light beam output toward the prescribed horizontal position on projection plane 112 and in response outputs a detection signal to horizontal position detection portion 4224. Horizontal position detection portion 4224 receives the detection signal from photodetector 4228 to detect that the received timing is the timing at which a light spot is applied to the prescribed horizontal position. Here, since mirror 372 is resonantly driven, horizontal position detection portion 4224 can detect the spot position in the horizontal direction of the present light beam on projection plane 112 based on data D1 stored in advance and the elapsed time since light passed through photodetector 4228. Data D1 is data designating the prescribed horizontal position on projection plane 112. Furthermore, the elapsed time is counted based on clock CLK applied from CPU 418. Clock CLK is generated and output based on data of resolution and frame rate of image data read by CPU 418 from memory 420. Therefore, the position detected by horizontal position detection portion 4224 refers to any position of the positions (X0, Y0)-(Xm, Ym) on the left side in FIG. 4.

Vertical position detection portion 4223 detects the present spot position in the vertical direction on projection plane 112. Vertical position detection portion 4223 receives vertical drive pattern data DPD sequentially read in chronological order from memory 4164 in synchronization with clock 444 and detects the present spot position in the vertical direction based on time data held by the received vertical drive pattern data DPD. This time data refers to data corresponding to a time component on the axis of abscissas in FIG. 7.

As described above, a scanning position of light on projection plane 112 by resonant vibration of mirror 372 can be detected.

Next, a method of generating vertical synchronization signal 521, horizontal synchronization signal 522 and pixel synchronization signal 523 for designating a drive timing of the light source will be described.

Vertical synchronization signal generation portion 4225 generates and outputs vertical synchronization signal 521. Specifically, vertical synchronization signal generation portion 4225 receives the vertical scanning position detection signal output from vertical position detection portion 4223 and the horizontal scanning position detection signal output from horizontal position detection portion 4224 and outputs a pulse signal, based on the received signals, when detecting that mirror 372 is positioned such that a light spot is positioned on the vertically uppermost portion of projection plane 112 (corresponding to a horizontal synchronization section), and that it is detected that a scan time of one frame has passed and light has passed through the prescribed horizontal position. This pulse signal corresponds to vertical synchronization signal V designating vertical scan period VTS in FIG. 6.

Horizontal synchronization signal generation portion 4226 generates and outputs horizontal synchronization signal 522. Specifically, horizontal synchronization signal generation portion 4226 receives the horizontal scanning position detection signal output from horizontal position detection portion 4224 and outputs a pulse signal when a prescribed delay time counted by the input clock CLK has elapsed from the point of time when it was detected that the light beam passed through the prescribed horizontal position, based on the received signal. This pulse signal corresponds to horizontal synchronization signal H designating horizontal scan period HTS in FIG. 6.

This delay time used to generate the horizontal synchronization signal is determined based on data read from table 4229 for each image display device 300. In other words, the frequency of each horizontal drive signal 441 and data of the corresponding delay time are stored in advance in table 4229 of horizontal synchronization signal generation portion 4226. Horizontal synchronization signal generation portion 4226 receives horizontal drive signal 441 received from mirror monitor portion 4222, detects the frequency thereof, and searches table 4229 based on the detected frequency to read data of the corresponding delay time.

Pixel synchronization signal generation portion 4227 generates and outputs pixel synchronization signal 523. Pixel synchronization signal 523 is represented by clock pulse signal P in FIG. 6. Referring to FIG. 4, pixel synchronization signal 523 refers to a signal indicating a timing to drive LD according to the result obtained by modulation portion 421 modulating the value of each pixel, pixel (0, 0)-pixel (m, n) constituting an image to be displayed.

Specifically, pixel synchronization signal generation portion 4227 receives the above-noted horizontal drive signal 441 and detects the frequency of the received horizontal drive signal 441. Then, based on the detected frequency, a time t required for the light spot to pass through a horizontal scan one line of projection plane 112 is detected. Then, a time obtained by dividing the detected time t by the number of pixels corresponding to a horizontal scan one line is detected. The detected time corresponds to a clock pulse width. It is noted that the number of pixels corresponding to horizontal scan one line used to detect a clock pulse width is designated by pixel number data 4331 read by CPU 418 from memory 420.

Pixel synchronization signal generation portion 4227 receives horizontal synchronization signal 522 output from horizontal synchronization signal generation portion 4226. Every time the pulse signal (horizontal synchronization signal H in FIG. 6) is detected based on the received horizontal synchronization signal 522, clock pulse signal P according to the above-noted clock pulse width is successively generated and output. Therefore, this clock pulse signal P is output by the number of pixels of horizontal scan one line in one horizontal scan period HTS in FIG. 6.

Figure 10:
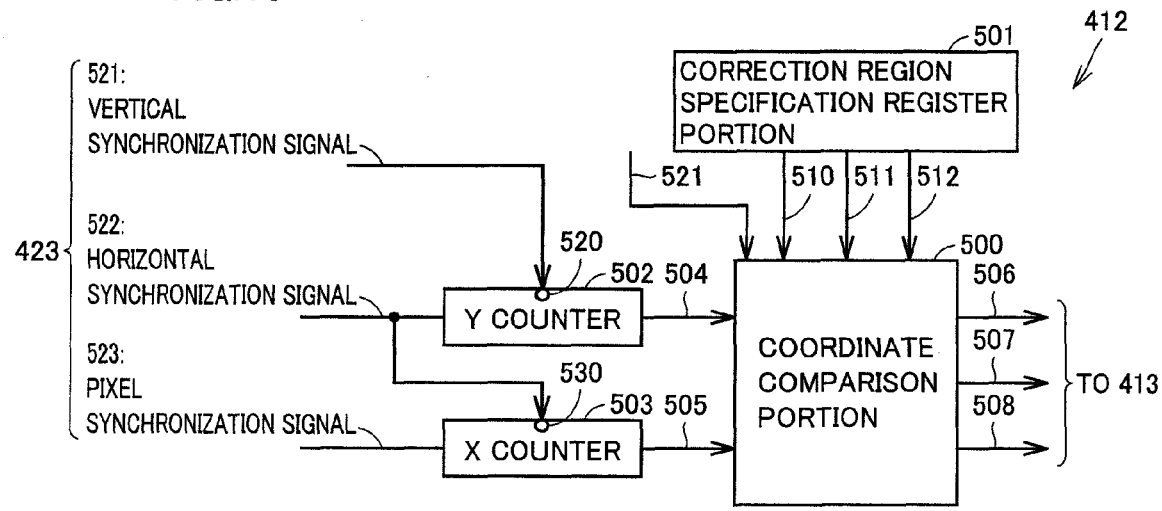
FIG. 10 is a diagram showing an exemplary configuration of a correction region detection portion in accordance with the present embodiment.
Figure 11:
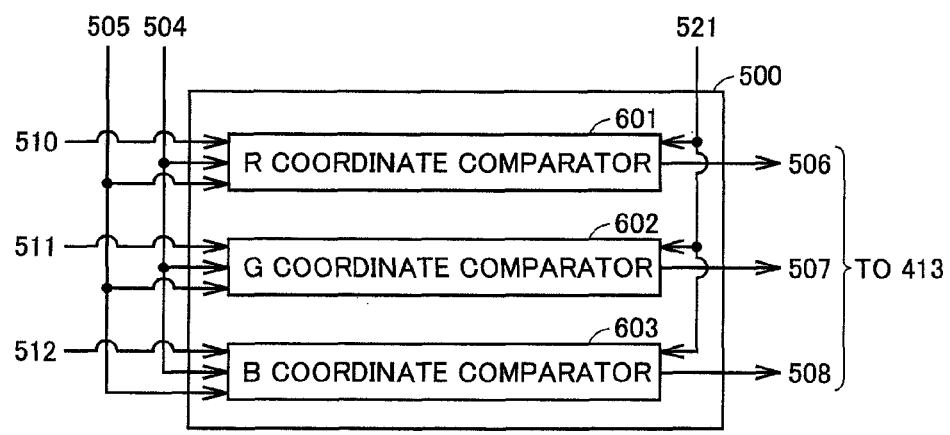
FIG. 11 is a diagram showing a configuration of a coordinate comparison portion in accordance with the present embodiment.

Referring to FIG. 10, a configuration of correction region detection portion 412 will be described. Correction region detection portion 412 includes a coordinate comparison portion 500, a correction region specification register portion 501, a Y counter 502, and an X counter 503, for controlling the timing to operate correction amount derivation portion 413. Correction region detection portion 412 detects the timing to drive LD based on the result of modulating data of correction region 64 that is a pixel pattern region for use in derivation of a correction amount.

Correction region specification register portion 501 outputs signals 510, 511 and 512 for designating correction region 64 for each image of one frame applied on projection plane 112. Signals 510, 511 and 512 respectively correspond to signals of laser lights of red, green and blue.

Coordinate comparison portion 500 includes coordinate comparators 601, 602 and 603 respectively corresponding to laser lights of red, green and blue, as shown in FIG. 5.

Y counter 502 and X counter 503 respectively output signals 504 and 505 for specifying the scanning position on projection plane 112 according to the vertical direction in which the Y-axis extends and the horizontal direction in which the X-axis extends, respectively, pixel by pixel. The scanning position specified by signals 504 and 505 corresponds to a spot position of laser light to be applied to projection plane 112.

Y counter 502 has a reset terminal 520 receiving vertical synchronization signal 521 designating a scan period of one frame (one vertical scan period) and then performs a count operation to output an output signal 504 to coordinate comparison portion 500 to indicate a count value, every time horizontal synchronization signal 522 for designating one horizontal scan period in the X-axis is input. In operation, when vertical synchronization signal 521 is provided to reset terminal 520 to designate the end of image display of one frame, the count value of Y counter 502 is reset and output signal 504 is reset.

X counter 503 has a reset terminal 530 receiving horizontal synchronization signal 522 designating one horizontal scan period and then performs a count operation to output an output signal 505 to coordinate comparison portion 500 to indicate a count value, every time pixel synchronization signal 523 for designating a position of pixel to be scanned is input. In operation, when horizontal synchronization signal 522 is provided to reset terminal 530 to designate the end of one horizontal scan period, the count value of X counter 503 is reset and output signal 505 is reset.

Vertical synchronization signal 521, horizontal synchronization signal 522, and pixel synchronization signal 523 correspond to position signal 423 based on image data indicating the present scanning position of an image pixel by pixel, which is provided from timing control portion 422. Position signal 423 designates a spot position of laser light on projection plane 112 when a pixel (any pixel of pixels (0, 0)-(m, n) in FIG. 4) is displayed. Therefore, output signals 504 and 505 designate the position (spot position) to be irradiated with laser light on projection plane 112 by an address (x, y) corresponding to the count values indicated by output signals 505 and 504.

Coordinate comparison portion 500 has coordinate comparators 601, 602 and 603 corresponding to red laser light, green laser light and blue laser light, respectively. Each coordinate comparator receives output signals 504 and 505 in parallel. Furthermore, coordinate comparators 601, 602 and 603 receive from correction region specification register portion 501 signals 510, 511 and 512, respectively, indicating an address (x, y) on projection plane 112 to designate correction region 64. Correction region register portion 501 reads an address (x, y) designating the coordinates of the corresponding portion on projection plane 112 of region 64 in FIG. 16A as stored beforehand in a not-shown internal register and outputs the same as signals 510, 511 and 512.

Here, an image is displayed frame by frame. For example, an image is constituted with 60 frames per second, and each frame has regions 62, 63 and 64 according to the arrangement in FIG. 16A. Here, for the sake of simplicity, it is assumed that a frame corresponds to a rectangular-shaped image on a two-dimensional plane as defined by the X-axis and the Y-axis orthogonal to each other and projection plane 112 is also rectangular.

Coordinate comparators 601, 602 and 603 compare address (x, y) of the part corresponding to correction region 64 as indicated by signals 510, 511 and 512 with address (x, y) corresponding to the spot position on projection plane 112 of the present laser light as indicated by signals 504 and 505, respectively. Based on the comparison result, correction timing designation signals 506, 507 and 508 are generated and output to designate the timing to derive a correction amount. Each of coordinate comparators 601, 602 and 603 receives vertical synchronization signal 521 and has the output signal reset every time display of one frame as designated by vertical synchronization signal 521 is ended (the end of one vertical scan period).

Specifically, when it is detected that both of the above-noted addresses agree to each other based on the above-identified comparison result, that is, when it is detected that the part corresponding to correction region 64 of projection plane 112 is currently scanned by laser light, correction timing designation signals 506-508 are set to level "H" for output. When it is detected that both addresses do not agree to each other, that is, when it is detected that the region other than the part corresponding to correction region 64 of projection plane 112 is currently scanned by laser light, correction timing designation signals 506-508 are set to level "L" for output. Therefore, for a period of level "H" of each of correction timing designation signals 506-508, the timing at which LD is to be driven to apply laser light according to a particular pattern present in a particular position corresponding to correction region 64 is designated. In this period, it is designated that it is the timing to correct variations of output of LD applying laser light of a corresponding color.

Figure 12:
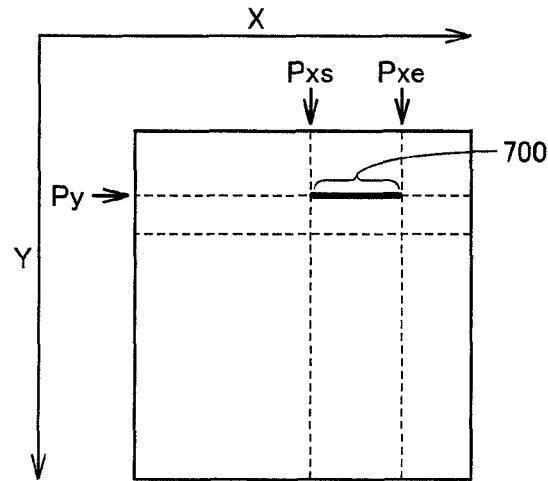
FIG. 12 is a diagram showing an example of a correction region detected by the correction region detection portion in accordance with the present embodiment.
Figure 13:
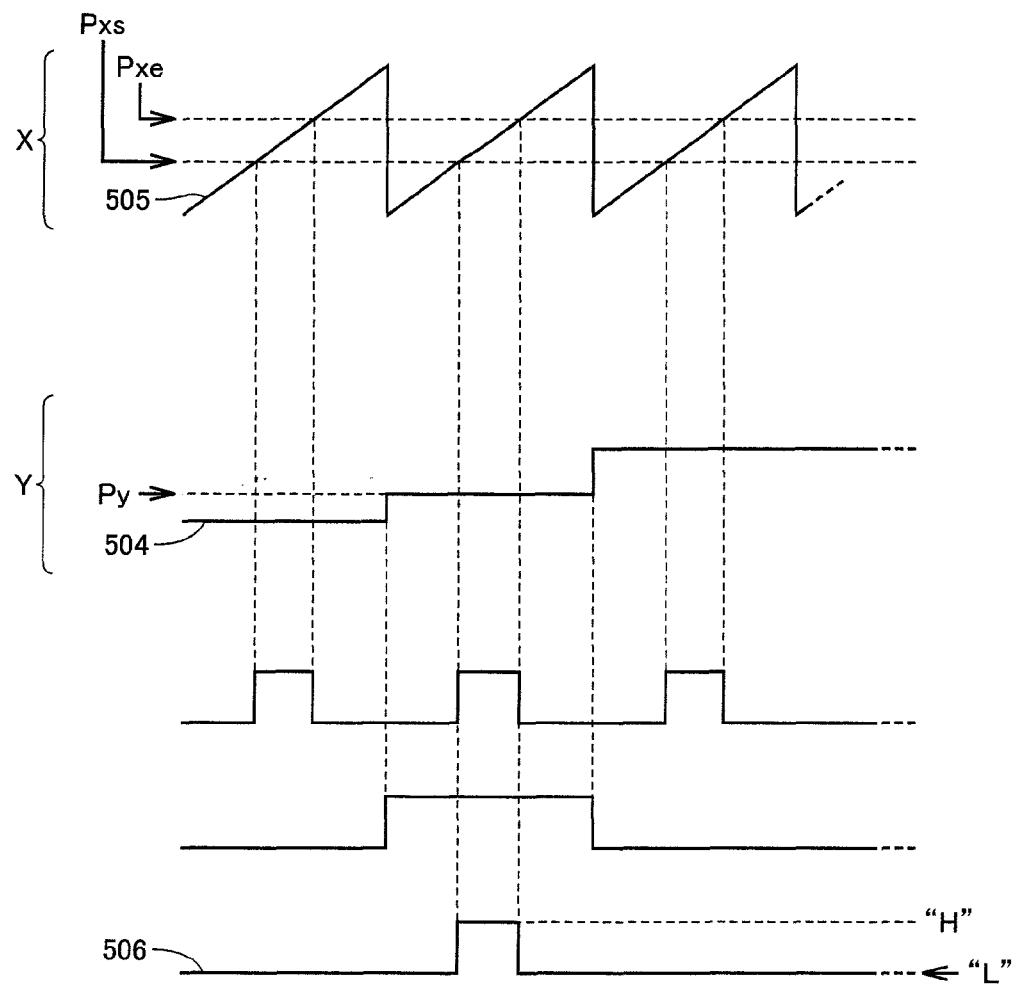
FIG. 13 is a timing chart showing an operation of the correction region detection portion when a correction region in FIG. 12 is detected.

FIG. 12 shows an example of the correction region detected by correction region detection portion 412 and FIG. 13 shows a timing chart for illustrating an operation of correction region detection portion 412 when the correction region in FIG. 12 is detected. Referring to FIG. 12, a frame is assumed to have a correction region 700 designated by a row of pixels on a line connecting two coordinates (Pxs, Py) and (Pxe, Py). Here, although for the sake of illustration, correction region 700 is shown in a simplified manner, the processing for correction region 700 may be adopted similarly to correction region 64.

Referring to FIG. 13, signal 505 designating scan in the X-axis direction periodically passes through coordinates Pxs and Pxe in the X-axis direction of projection plane 112 in a scan period of one frame. On the other hand, signal 504 designating scan in the Y-axis direction changes as shown in FIG. 13 in a period during which one frame is scanned. Therefore, for example, signal 506 in FIG. 13 output from coordinate comparator 601 goes to level "H" only in a period during which correction region 700 in FIG. 12 is designated, and goes to level "L" for output in the other period. This period of level "H" is a period during which correction region 700 is designated. In other words, correction amount derivation portion 413 is notified that it is the period during which the timing to drive LD to apply laser light according to a particular pattern present in a particular position corresponding to correction region 700 on image data is designated. The same applies to the other signals 507 and 508.

Referring to FIG. 14A and FIG. 14B, correction amount derivation portion 413 will be described. In order to derive a correction amount of a laser drive signal, correction amount derivation portion 413 has an amplification portion 509 and correction amount derivation units 581, 582 and 583 respectively corresponding to red laser 354, green laser 356 and blue laser 357. The correction amount derivation units store the respective tables 571-573 and receive the respective signals 506, 507, 508 output from the coordinate comparators for lights of corresponding colors. In addition, light detection signals 391, 392 and 393 of lights of corresponding colors are amplified through amplification portion 509 and thereafter provided. The amplified light detection signals 391, 392 and 393 refer to voltage signals. Furthermore, reference data stored beforehand in memory 420 is read and converted by modulation portion 421 into reference signals 491, 492 and 493, which are then provided to the respective correction amount derivation units.

In operation, correction amount derivation units 581, 582 and 583 detect the difference in signal level between the respective light detection signals 391, 392 and 393 and the respective reference signals 491, 492 and 493 and search the respective tables 571-573 based on the difference. Data read from the tables by the search are output as the respective correction amount designation signals 591, 592 and 593. Data of tables 571-573 will be described later.

Here, the procedure of correction amount derivation by correction amount derivation units 581, 582 and 583 will be described. Each of correction amount derivation units 581, 582 and 583 is configured and operated similarly, and therefore, correction amount derivation unit 581 is taken as a representative example and described here with reference to FIG. 15.

Correction amount derivation unit 581 operates to newly derive a correction amount for a period during which the input signal 506 designating the correction timing is at level "H" (see correction amount update period 601 in FIG. 15). In correction amount update period 601, correction amount derivation unit 581 compares light detection signal 391 output from photodetector 370 with the input reference signal 491, generates a correction amount based on the difference in signal level between them as indicated by the comparison result, and outputs the same as correction amount designation signal 591 to laser control portion 411. The correction amount derived in correction amount update period 601 is held and output in a correction amount hold period (period 602 in FIG. 15) immediately thereafter. The correction amount is held until the next correction amount period 601 is started.

Therefore, every time the timing to apply laser light to correction region 700 on image data is designated, a new correction amount is derived. Here, since the gradation level of laser light of each color forming a pixel in correction region 700 is predetermined, reference signal 491 is a voltage signal designating this predetermined gradation level. Correction amount derivation unit 581 compares the voltage levels of light detection signal 391 and reference signal 491, and outputs a voltage signal according to the difference based on the comparison as correction amount designation signal 591.

Figure 17:
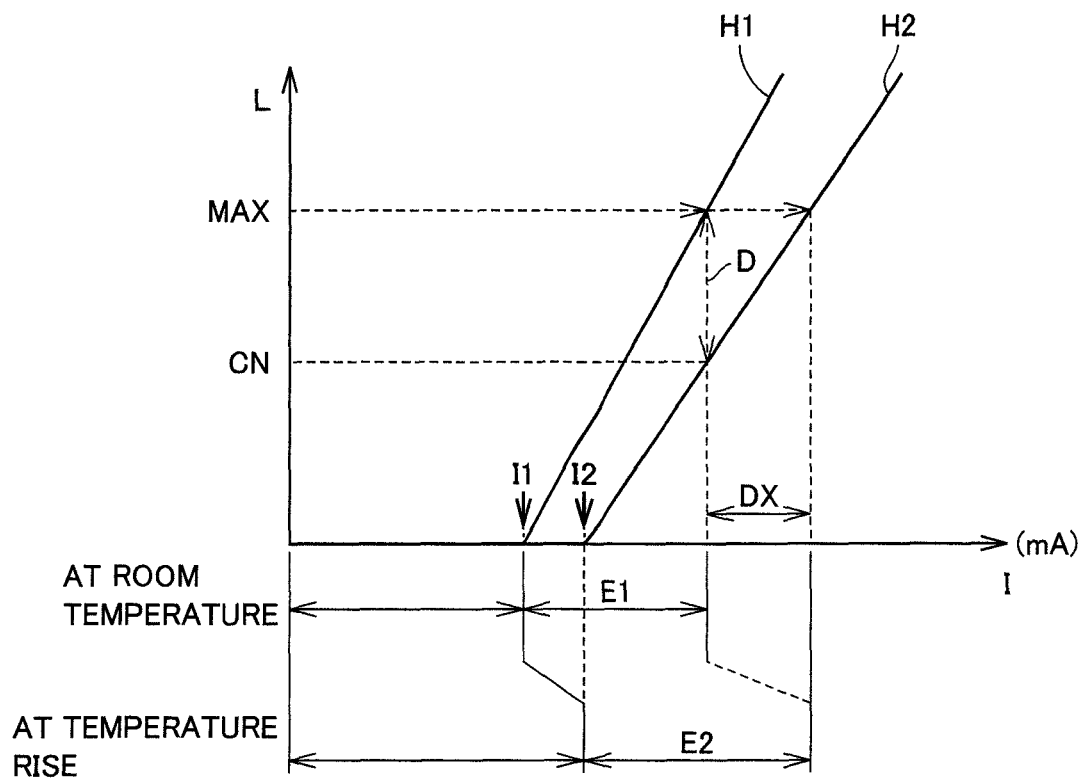
FIG. 17 is a diagram illustrating the characteristics of a laser diode in accordance with the present embodiment.

Here, referring to FIG. 17, the procedure of determination of correction amount by correction amount derivation unit 581 will be described. FIG. 17 shows a slope efficiency (output light intensity/drive current I (mA)) of LD. As shown in FIG. 17, the threshold current applied to LD and the slope efficiency (output light intensity/drive current I (mA)) changes by the effect of the changing temperature of the LD device itself. In other words, as LD is powered for a longer time, the junction portion of LD generates heat and the temperature of the LD device itself rises. With increasing temperature, the maximum light intensity that can be output is decreased, thereby diminishing the operation range of LD. This operation range corresponds to gradation control regions E1, E2 for controlling gradations in image display. In FIG. 17, when LD is at room temperature, the slope efficiency changes according to straight line H1, and at a temperature rise, the slope efficiency changes according to straight line H2.

Thus, assuming that, for example, an image is displayed according to 0-25 gradations according to gradation data designated by image data, at room temperature, LD starts emission with application of threshold current I1, and thereafter, up to maximum '255' gradation (maximum luminance MAX) can be displayed by increasing drive current I. The range from threshold current I1 to current applied when the maximum gradation is displayed is called gradation control region E1, and by controlling drive current I in a range indicated by gradation control region E1, gradation "0" up to gradation "255" can be displayed.

On the other hand, when the temperature of LD itself rises due to power-on for a long time, the slope efficiency changes according to straight line H2. In other words, LD starts emission when threshold current I2 (>I1) is applied. Accordingly, at a temperature rise, a desired gradation cannot be displayed even if drive current I is controlled in gradation control region E1. For example, even if maximum drive current I in gradation control region E1 is applied to display gradation "255," only CN (<MAX) of light intensity L of radiation light of LD can be obtained, and the intensity is decreased by difference D (MAX–CN). Therefore, at a temperature rise, even if drive current I is controlled according to straight line Hi which is the characteristic at room temperature, an image cannot be displayed according to the gradation designated by image data, thereby deteriorating the image quality of the display image.

In order to avoid the above disadvantage, in the present embodiment, drive current I of each LD is corrected for each correction amount update period 601. In other words, by utilizing that an image in correction region 64 is displayed at a prescribed gradation, the difference (corresponding to difference D in FIG. 17) between light detection signals 391-393 indicating the quantity of light actually emitted from LD for displaying the image and reference signals 491-493 indicating the quantity of emission light from LD which is required to display the image according to the prescribed gradation is detected by correction amount derivation portion 413, so that drive current I is corrected using adjustment amount D1 (corresponding to adjustment amount data 575 in FIG. 14B) according to the detected difference.

Correction amount derivation units 581-583 of correction amount derivation portion 413 store in advance a plurality of difference data 574 indicating the above-noted difference (corresponding to difference D in FIG. 17) and adjustment amount data 575 (corresponding to adjustment amount DX) corresponding to each difference data 574 in the respective tables 571, 572 and 573.

A characteristic value indicating the correlation (the relation shown by straight line H1) at room temperature between drive current I and light intensity L shown in FIG. 17 is detected by experiment or the like, and based on the detected value, each difference data 574 and the corresponding adjustment amount data 575 are detected and stored beforehand in tables 571, 572 and 573. Correction amount derivation units 581-583 detect the respective differences between light detection signals 391, 392, 393 and reference signals 491-493 according to straight line H2, and search the respective tables 571-573 based on the detected differences to read the corresponding adjustment amount data 575. Then, based on the read adjustment amount data 575, correction amount designation signals 591-593 each designating the adjustment amount are generated and output. Accordingly, using correction amount designation signals 591-593, for the drive signal of LD, the output variations resulting from a temperature change of LD and the like can be compensated for.

Figure 18:
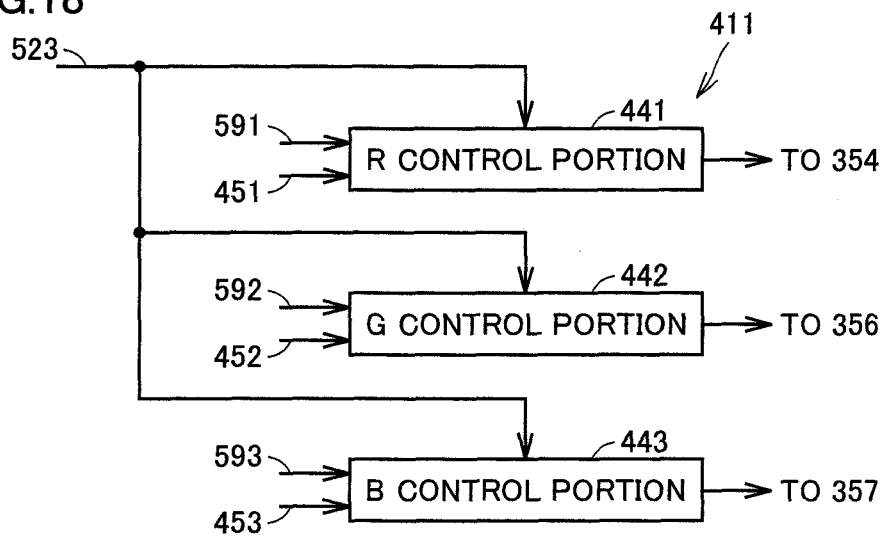
FIG. 18 is a diagram showing an exemplary configuration of a laser control portion in accordance with the present embodiment.

Referring to FIG. 18, laser control portion 411 includes an R control portion 441, a G control portion 442, and a B control portion 443 corresponding to lasers 354, 356 and 357, respectively. R control portion 441, G control portion 442, and B control portion 443 are configured and operated in the same manner, and therefore R control portion 441 as a representative example will be described here.

When correction amount designation signal 591 designating a new correction amount is input, R control portion 441 discards the held correction amount which was detected and provided in the previous correction amount update period 601 and updates (for example, increases) drive current I of LD as designated by gradation data 451 according to the correction amount designated by the newly input correction amount designation signal 591 this time to output the updated drive current I to red laser 354. The correction amount designated by the newly input correction amount designation signal 591 is held. Thus, red laser 354 is supplied with drive current I to enable gradation control in gradation control region E2 shown in FIG. 17. Therefore, in all of the display region of projection plane 112 including source image display region 62, accurate gradation display of a display image is enabled, thereby avoiding image quality degradation.

Figure 19:
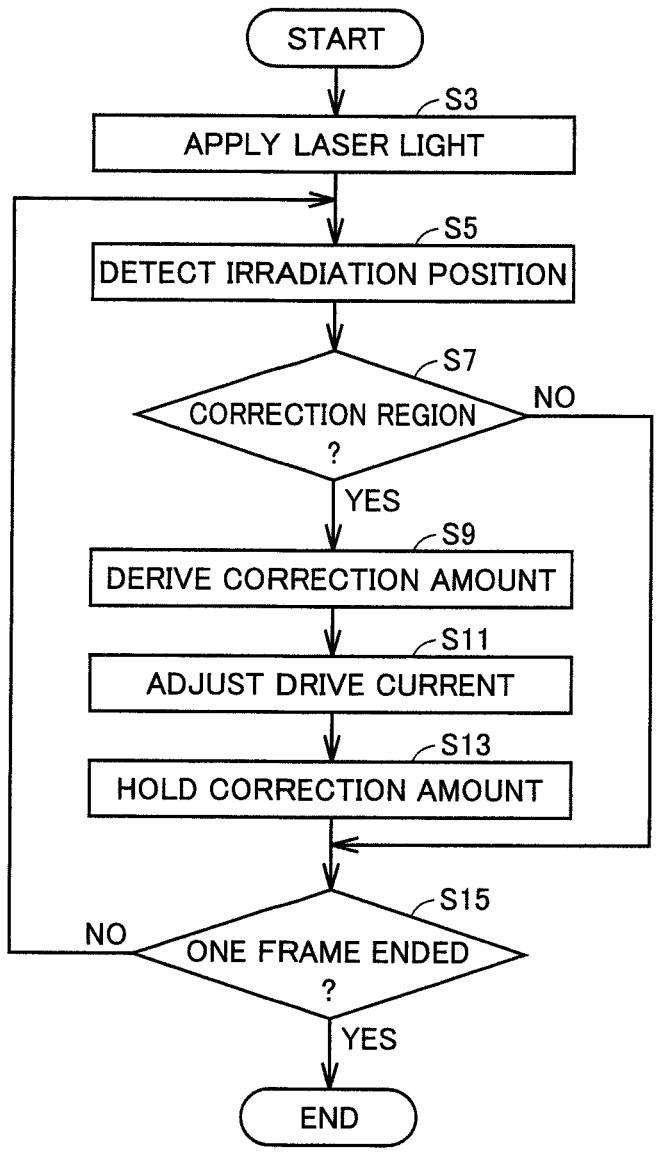
FIG. 19 is flowchart of a process in accordance with the present embodiment.

FIG. 19 shows a flowchart of a process procedure in accordance with the present embodiment. The program according to this flowchart is stored beforehand in memory 420, and the program is read from memory 420 and executed by CPU 418 so that each portion of image display device 300 is controlled thereby realizing the process according to the flowchart.; This flowchart is repeated for each frame constituting an image.

First, CPU 418 reads image data corresponding to regions 62-64 from memory 420 and provides the same to each portion. Thus, projection plane 112 is irradiated with laser light according to the image data modulated by modulation portion 421, so that the image shown in FIG. 16A is displayed on projection plane 112 (step S3).

Then, signals 504 and 505 are generated by the count operations of Y counter 502 and X counter 503 of correction region detection portion 412. Accordingly, the present spot position of laser light on projection plane 112 is detected (step S5).

Thereafter, coordinate comparison portion 500 detects whether the spot position of laser light on projection plane 112 falls in correction region 64 or not, at present, based on input signals 510-512 from correction region designation register portion 501 and signals 504 and 505 (step S7). If it is detected that now is not the timing (period) to irradiate correction region 64 with laser light (NO in step S7), the process moves on to step S15 described later.

On the other hand, if it is detected that now is the timing (period) to irradiate correction region 64 with laser light (YES in step S7), a correction amount is derived by correction amount derivation portion 413, and correction amount designation signals 591-593 each designating the derived correction amount are provided to laser control portion 411 (step S9).

For the respective lasers 354, 356 and 357 of red light, green light and blue light, laser control portion 411 adjusts drive current I based on signals 451-453 designated by the gradation of image data provided through modulation portion 421 and correction amount designation signals 591-593 (step S11). Until the next correction region is detected, that is, until the subsequent correction amount update period 601 is detected, the correction amount designated by correction amount designation signals 591-593 is held (step S13).

Thereafter, CPU 418 detects whether scan of one frame is ended or not based on vertical synchronization signal 521 output by timing control portion 422 (step S15). If it is detected that scan of one frame is not ended, the process moves on to step S5 in order to detect a period during which LD is driven based on the result of modulating the next image data of correction region 64. Therefore, every time a period during which correction region 64 is scanned by a light spot is detected, the correction amount detected by correction amount derivation portion 413 is updated.

On the other hand, if it is detected that scan of one frame is ended (YES in step S15), a series of processes ends.

In accordance with the present embodiment, drive current I of LD can be adjusted using a known pixel pattern included in a unique image of image display device 300. Accordingly, even when output variations of LD occur in a period of laser light projection on display region 62, for example, even when output variations occur due to the characteristics of LD, they are corrected, thereby improving the precision of laser light output control. As a result, gradation representation errors of a display image resulting from output variations of LD are reduced, thereby enhancing the quality of a display image.

Although in the present embodiment, correction region 64 which is the frame of UI display region 63 or the correction region of the background image of UI display region 63 is illustrated by way of example, a part of these correction regions may be selected to be allocated as a correction region, without limiting to all of these regions. More specifically, an interface image unique to image display device 300 or all or a part of the interface image may be allocated.

Furthermore, which of correction regions of FIG. 16A-FIG. 16C is used may be switched selectively and designated for CPU 418 by the user operating operation panel 430 of image display device 300.

Alternatively, the correction region may be allocated individually for each of emission colors (red, green, blue) of LD. Alternatively, a plurality of correction regions may be arranged so that correction can be made multiple times in one frame.

Furthermore, in the present embodiment, correction amount designation signals 591-593 are derived for each frame, although the present invention is not limited thereto. For example, correction amount designation signals 591-593 may be changed every multiple frames, based on the quantity of light in the correction region as detected over a plurality of frames.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An image display device displaying an image by irradiating a projection plane with laser light while scanning the same in vertical and horizontal directions of said the projection plane, comprising:
    a laser driven based on a drive signal to output laser light having a quantity of light based on a gradation signal according to image data;
    a scanning position detection unit configured to detect a scanning position on said projection plane irradiated by said laser light;
    a vertical horizontal synchronization signal generation unit configured to generate and output a vertical synchronization signal and a horizontal synchronization signal designating a drive timing of said laser, based on said scanning position detected by said scanning position detection unit;
    a drive signal generation unit configured to generate a pixel synchronization signal according to generated said vertical and horizontal synchronization signals and said image data and output generated said pixel synchronization signal as said drive signal;
    a region detection unit configured to receive said generated vertical and horizontal synchronization signals and said pixel synchronization signal and detect whether or not a part corresponding to a prescribed region of said image is scanned on said projection plane by said laser light, based on the received synchronization signals, wherein the prescribed region of said image corresponds to a part of the projection plane;
    a quantity of light detection unit configured to detect a quantity of light of said laser light output by said laser; and
    a signal correction unit configured to correct said gradation signal only when the region detection unit detects that the part corresponding to the prescribed region of said image is scanned on the projection plane by said laser light,
    wherein when said region detection unit detects that the part corresponding to the prescribed region of said image is scanned on said projection plane by said laser light, said signal correction unit corrects said gradation signal, based on a difference between said quantity of light detected by said quantity of light detection unit and a prescribed quantity of light to be output from said laser for displaying the image corresponding to said prescribed region, and outputs corrected said gradation signal to said laser,
    wherein the region detection unit comprises:
        a coordinate detection unit configured to:
            receive the vertical, horizontal, and pixel synchronization signals, and
            detect a position on the projection plane irradiated by laser light, by coordinates according to the vertical and horizontal directions, based on the received synchronization signals; and
        a coordinate comparison unit configured to:
            receive the detected coordinates from the coordinate detection unit,
            compare prescribed coordinates designating the part corresponding to the prescribed region with the coordinates detected by the coordinate detection unit, and
            output a comparison result designating whether or not the part corresponding to the prescribed region of the image is scanned on the projection plane by the laser light.

2. The image display device according to claim 1, wherein said scanning position detection unit includes a light detection unit detecting said laser light in an optical path of said laser light irradiated from said laser toward a prescribed scanning position of said projection plane, and detects the scanning position on said projection plane by said laser light based on an elapsed time from a point of time when said laser light is detected by said light detection unit and said prescribed scanning position.

3. The image display device according to claim 2, wherein when said region detection unit detects that the part corresponding to the prescribed region of said image is scanned on said projection plane by said laser light, said signal correction unit corrects said gradation signal according to said difference and a prescribed characteristic value indicating a correlation between said quantity of light of laser light output by said laser at room temperature and a level of said gradation signal.

4. The image display device according to claim 3, wherein said image data includes data of a source image corresponding to contents to be displayed and data of an image of an interface unique to said image display device to be displayed for externally providing an instruction to said image display device, and said prescribed region is a region corresponding to the image of said interface.

5. The image display device according to claim 4, wherein the region corresponding to the image of said interface is a frame-like region surrounding the image of said interface for separating said source image from the image of said interface region.

6. The image display device according to claim 4, wherein the region corresponding to the image of said interface is a region in which an image serving as a background of the image of said interface is displayed.

7. The image display device according to any one of claim 4, wherein said prescribed region is a part or all of the region corresponding to the image of said interface.

8. The image display device according to claim 1, wherein said image data includes data of a source image corresponding to contents to be displayed and data of an image of an interface unique to said image display device to be displayed for externally providing an instruction to said image display device, and said prescribed region is a region corresponding to the image of said interface.

9. The image display device according to claim 8, wherein the region corresponding to the image of said interface is a frame-like region surrounding the image of said interface for separating said source image from the image of said interface region.

10. The image display device according to claim 8, wherein the region corresponding to the image of said interface is a region in which an image serving as a background of the image of said interface is displayed.

11. The image display device according to claim 8, wherein said prescribed region is a part or all of the region corresponding to the image of said interface.

12. The image display device according to claim 2, wherein said image data includes data of a source image corresponding to contents to be displayed and data of an image of an interface unique to said image display device to be displayed for externally providing an instruction to said image display device, and said prescribed region is a region corresponding to the image of said interface.

13. The image display device according to claim 1, wherein the prescribed region of said image corresponds to an end portion of the projection plane.

14. The image display device according to claim 1, wherein the position of the prescribed region of said image is variable.

* * * * *